June 4, 1963  D. W. WILLIAMS ETAL  3,092,565
FUEL ELEMENTS FOR NUCLEAR REACTORS
Filed July 28, 1960
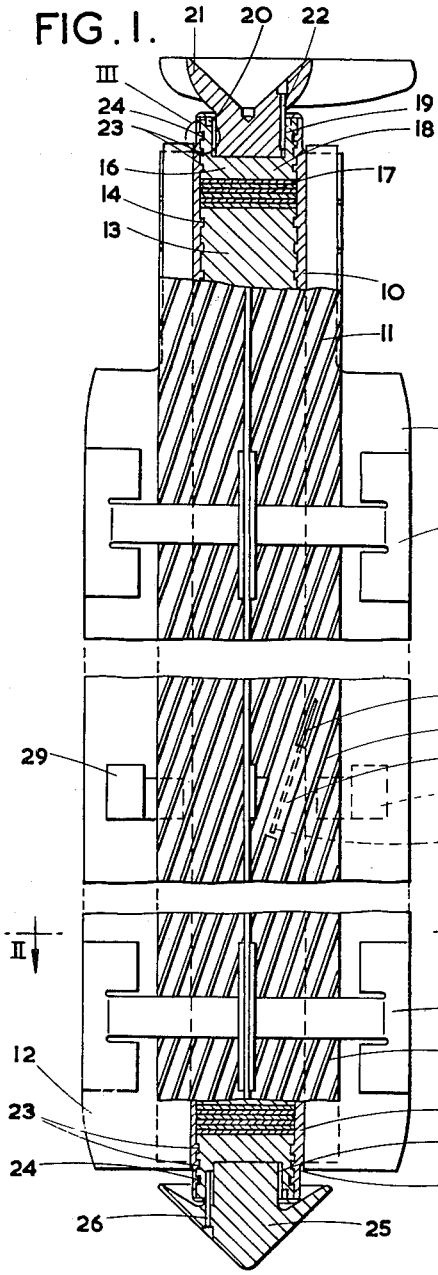
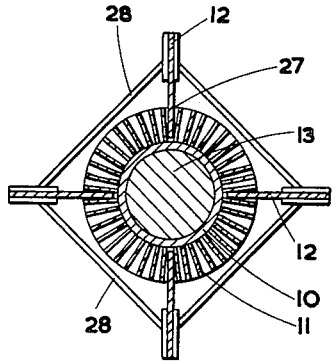
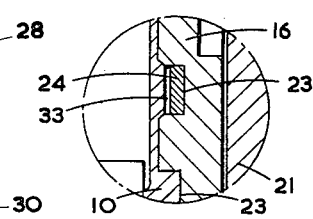
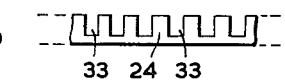
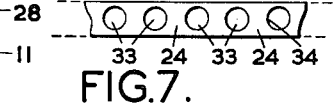
INVENTORS
David William Williams
Trevor Eyton Jones
Eric Arthur Crouch Crouch
BY Larson and Taylor United States Patent Office 3,092,565
Patented June 4, 1963

3,092,565
FUEL ELEMENTS FOR NUCLEAR REACTORS
David William Williams and Trevor Eyton Jones, Seascale, Cumberland, and Eric Arthur Crouch Crouch, Abingdon, England, assignors to United Kingdom Atomic Energy Authority, London, England
Filed July 28, 1960, Ser. No. 45,918
Claims priority, application Great Britain July 14, 1960
1 Claim. (Cl. 204—193.2)

This invention relates to nuclear reactor fuel elements of the kind comprising a nuclear fuel member enclosed in a protective sheath.

It is appreciated that the containment by a sheath of fission products obtained by burning nuclear fuel cannot always be guaranteed and hence the current design of nuclear reactor includes what has become known as "burst cartridge detection (B.C.D.) apparatus," that is apparatus to detect fission products (or their decay products) which may escape through leakage paths in the sheaths.

Experience obtained in operating pressurised carbon dioxide cooled nuclear reactors using uranium fuel members enclosed in magnesium alloy sheaths is that the B.C.D. apparatus shows one or other of two kinds of sheath failure. In one failure a slowly increasing record of fission product release is detected whilst in the other kind of failure a very rapidly increasing signal is obtained. The latter kind of failure is naturally regarded as the more serious and was considered to be the more inexplicable.

However, investigation has brought to light the possibility of a leakage in a fuel element sheath of such a character that detectable fission products do not escape out from the fuel to the reactor coolant, but rather, coolant leaks into the fuel member so that oxidation of the fuel member takes place until the volume expansion caused by oxide is enough to provide a larger path through which detectable fission products can diffuse out against the coolant gas pressure to give a large signal on the B.C.D. apparatus.

It is accordingly an object of the present invention to provide a fuel element in which the liability of large fission product leakage from the fuel element can be avoided by earlier detection of a small leakage.

According to the invention a fuel element for a nuclear reactor comprises a nuclear fuel member contained within a protective sheath closed at either end by end caps, grooves being defined between the inside of the ends of the sheath and the end caps and inserts of nuclear fuel material being located in said grooves characterised in that the inserts of nuclear fuel material are of smaller cross section than the cross section of the grooves whereby a volume of free space exists in the grooves.

The end caps are joined to the sheath by welds and should a leak occur in either weld then the leakage of fission products will be from the insert of nuclear fuel material in proximity with the weld. Thus the fission products will therefore have a very short path to travel and should diffuse into the coolant to reach the burst cartridge detection apparatus before they decay and thus give early warning of the leak.

The volume of free space clearly defines the beginning of a leak path between end caps and sheath and also provides a region into which fission products generated in the insert can gather, thus providing a free head of fission products to escape along the leak path.

A fuel element embodying the invention will now be described by way of example with reference to the accompanying drawings in which:

FIG. 1 is a longitudinal sectional elevation.

FIG. 2 is a cross section along the line II—II in FIG. 1.

FIG. 3 is a detail of the area of FIG. 1 outlined by the chain dotted circle III.

FIGS. 4, 5, 6 and 7 are details of alternative modifications.

This fuel element has a sheath 10 with finned surface consisting of fortystart helical finning 11 and four longitudinal splitter fins 12. The length is forty-three inches overall. The element has a fuel rod 13 of magnesium reduced uranium which is adjusted with iron and aluminum to give a fine grain structure after transverse quenching from beta phase and annealing in the alpha phase so that it will be less susceptible to wrinkling during irradiation. The rod 13 is 1.15 inches in diameter with grooves 14 at intervals during its length. During manufacture the can is hydraulically pressurised into these grooves to prevent the sheath 10 and rod 13 deforming (ratcheting) with respect to one another due to differential thermal expansion during thermal cycling. The rod 13 is machined after heat treatment and shortly before confining in its sheath 10 to minimise the oxide film with consequent reduction in temperature drop between outer face of rod 13 and inner face of sheath 10.

The fins 11 have a 16 inch lead and an overall length of 41¾ inches with a sheath wall thickness of 0.060–0.075 inch. The fins 11 finish 7/16 inch short of the end of the can and each has a radius 15 to minimise strain concentration. The internal diameter of the sheath 10 is 1.17 inches and the outside diameter over the fins 11 is 2.25 inches. The ends of the sheath 10 are bored out to a diameter of 1.19 inches and a depth of 1.2 inches to accommodate end caps 16 and alumina insulating discs 17. The fins 11 have a fin tip taper of 0.047 to 0.027 inch. The sheath 10 is made from "magnox" magnesium alloy and is impact extruded.

The end caps 16 have a base part 18 and a skirt part 19. The upper end cap 16 has an internal thread 20 to take a threaded end fitting 21 which is retained by a locking pin 22 and the lower end cap 16 has an internal thread 20 to take a threaded end cone 25 which is locked by a pin 26. The pins 22 and 26 are locked by peening.

The outer surface of each of the end caps 16 has three circumferential grooves 23 and the caps 16 are .002 inch oversize with respect to the diameter of the ends of the sheath 10 so that the ends caps 16 are an interference fit in the sheath 10. The caps 16 are joined and sealed with the sheath 10 at an edge sealing weld made by an argon arc process with 0.15% addition of nitrogen to the argon.

As shown in the detail of FIG. 3, the outermost of the grooves 23 in both end caps 16 is fitted with a band of uranium foil 24 (containing 500 parts per million of carbon) which is 0.40 inch wide and 0.008 inch thick. During pressurisation of the fuel element to force the sheath 10 into the grooves 14 in the fuel rod, 13 the sheath 10 is also forced into the grooves 23 in the end caps 16 thus strengthening the joint between the end caps 16 and the sheath 10.

The splitter fins 12 which are 41 inches long and 0.062 inch thick are loosely fitted in longitudinal slots 27 milled in the fins 11. The splitter fins 12 project 0.2 inch beyond the fins 11 in an axial direction to maintain their full effect even after the fuel element has expanded lengthwise under irradiation. The splitter fins are loosely located by braces 28 and locked by clips 29 engaging between the fins 11. The fuel element is fitted with thermocouples 30 in drillings 31 in a solid part 32 left between two of the fins 11.

Should leakage occur at the joint between either of the end caps 16 and the sheath 10, fission products generated in the corresponding uranium foil 24 have only a short path to travel before entering the coolant gas stream and passing to the burst cartridge detection apparatus. By reason of the shortness of the path in escaping from the fuel element the fission products have not time to decay to an inappreciable level before they reach the B.C.D. apparatus and hence give early warning of the defect in the fuel element.

As shown in FIG. 3 the band 24 is thinner than the depth of the groove 23 in order to provide a volume 33 of free space clearly defining the beginning of a leak path between the end caps 16 and sheath 10 and also provides a region into which fission products generated in the band of uranium foil 24 can gether thus providing a free head of fission products to escape along the leak path.

Alternative methods of providing a volume of free space are shown in FIGS. 4, 5, 6 and 7 which show part of the band 24 of uranium foil in developed form.

In FIG. 4 one edge of the band 24 is cut away in sections so that the band 24 is of comb-like form, the free space 33 existing between the remaining solid parts of the band.

In FIG. 5 the band 24 is surface roughened such as by knurling to define free space.

In FIGS. 6 the band 24 is drilled with a series of equispaced holes 34 defining the free space 33.

In FIG. 7 a sereis of diagonal interconnecting slots 35 are cut in the surface of the band 24 to define the free space 33.

We claim:

A fuel element for a nuclear reactor comprising a nuclear fuel member, a protective sheath enclosing said nuclear fuel member, end caps closing the ends of said sheath, at least one groove between the inside of the end of the sheath and the end cap, an insert of nuclear fuel material being located in said groove, the insert of nuclear fuel material being of smaller cross section than the cross section of the groove whereby a volume of free space exists in the groove.

References Cited in the file of this patent

UNITED STATES PATENTS

| | | |
|---|---|---|
| 2,813,070 | Fermi et al. | Nov. 12, 1957 |
| 2,871,558 | Colbeck | Feb. 3, 1959 |
| 2,873,853 | Burton | Feb. 17, 1959 |
| 3,037,924 | Creutz | June 5, 1962 |

OTHER REFERENCES

"Nuclear Power," July 1959, pp. 77–79.